3,769,279
HYDRAZONE DYESTUFFS
Hans-Peter Kuhlthau and Roderich Raue, Leverkusen, Germany, assignors to Bayer Aktiengesellschaft, Leverkusen, Germany
No Drawing. Filed Aug. 18, 1971, Ser. No. 172,876
Claims priority, application Germany, Aug. 18, 1970, P 20 40 872.4
Int. Cl. C09b 23/04
U.S. Cl. 260—240 G   10 Claims

ABSTRACT OF THE DISCLOSURE

Hydrazone dyestuffs, processes for their manufacture and their use for dyeing and printing of polyacrylnitrile, copolymers of acrylnitrile with other vinyl compounds, acid modified aromatic polyesters, acid modified polyamides, leather, tanned cotton, cellulose, polyurethanes and for the production of writing liquids and stamping inks.

---

The subject-matter of the invention comprises new hydrazone dyestuffs of the formula

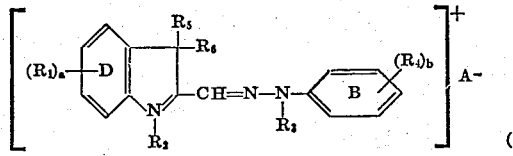

in which $R_1$ stands for halogen, lower alkyl, cycloalkyl, aralkyl, lower alkoxy, nitro, carboalkoxy, cyano, acyl, acylamino, amino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkyl-sulphamoyl, alkylsulphonyl, arylsulphonyl, trifluoromethyl, or for aryloxy, aralkoxy, carboxylic acid aralkyl ester, carboxylic acid aryl ester, or for aryloxy-alkyl;

$R_4$ stands for halogen, lower alkyl, cycloalkyl, aralkyl, lower alkoxy, nitro, carboalkoxy, cyano, acyl, acylamino amino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkyl-sulphamoyl, alkylsulphonyl, arylsulphonyl, trifluoromethyl, or for aryloxy, aralkoxy, carboxylic acid aralkyl ester, carboxylic acid aryl ester, or for aryloxy-alkyl; and at least one of the substituents $R_1$ and $R_4$ represents aryloxy, aralkyloxy, carboxylic acid aralkyl ester, carboxylic acid aryl ester or aryloxy-alkyl;

$R_2$ stands for lower alkyl, cycloalkyl, aralkyl or aryl;

$R_3$ stands for hydrogen; for alkyl which may be substituted by lower carboalkoxy or lower alkoxy or may close an optionally substituted ring in the o-position to the ring B; or for cycloalkyl, aralkyl or lower alkenyl;

$R_5$ stands for lower alkyl, aralkyl or cycloalkyl;

$R_6$ stands for lower alkyl, aralkyl or cycloalkyl;

$a$ stands for the numbers 0, 1, 2 or 3;

$b$ stands for the numbers 0, 1, 2 or 3; and $A^-$ stands for an anion; and in which the rings B and D may be fused with carbocyclic rings, and the aromatic carbocyclic rings of the dyestuff may contain further non-ionic substituents, such as e.g. chlorine, bromine, fluorine atoms or ethyl, methyl, methoxy, carbomethoxy, nitro or nitrile groups.

The invention also relates to processes for the production of the dyestuffs and to their use for dyeing and printing.

Aryloxy, aralkoxy, carboxylic acid aralkyl ester, carboxylic acid aryl ester and aryloxy-alkyl may be substituted in the aromatic radical by lower alkyl, halogen, lower alkoxy, carboalkoxy, cyano, nitro and/or hydroxy.

Suitable lower alkyl radicals are, for example: methyl, ethyl, n-propyl, iso-propyl, n-butyl, iso-butyl, tert.-butyl and iso-amyl.

Alkylsulphonyl stands, for example, for methyl- or ethyl-sulphonyl; arylsulphonyl e.g. for phenylsulphonyl.

Halogen stands for fluorine, chlorine, or bromine.

Lower alkoxy stands, for example, for methoxy, ethoxy, n-propoxy, iso-propoxy and n-butoxy.

Carboalkoxy primarily stands for carbomethoxy, carboethoxy, carbopropoxy, and carbobutoxy.

Suitable acyl radicals are primarily acetyl, propionyl, toluyl and benzoyl.

Suitable acylamino radicals are, for example, formylamino, acetylamino, n-propionylamino, benzoylamino, 4-chlorobenzoylamino and 4-methyl-benzoylamino.

Suitable aralkyl radicals are, for example: phenylmethyl, phenylethyl, phenylpropyl-(2,2) and the derivatives thereof, which may be substituted in the phenyl nucleus.

Cyclohexyl is of particular importance as cycloalkyl.

Aryl stands for carbocyclic aromatic hydrocarbons with 6–10 carbon atoms, such as phenyl and naphthyl and their derivatives such as 4-methylphenyl, 2-methylphenyl, 4-chlorophenyl, 2-chlorophenyl and 2-methyl-4-chlorophenyl.

N-alkyl-carbamoyl and N,N-dialkyl-carbamoyl stand, for example, for N-methyl-carbamoyl, N-ethyl-carbamoyl, N-n-butyl-carbamoyl, N,N-dimethyl-carbamoyl, N,N-diethyl-carbamoyl and N-methyl-N-ethyl-carbamoyl.

N-alkyl-N-aryl-carbamoyl stands, for example, for N-methyl-N-phenyl-carbamoyl and N-ethyl-N-phenyl-carbamoyl.

N-alkyl-sulphamoyl and N,N-dialkyl-sulphamoyl stand, for example, for N-methyl-sulphamoyl, N-ethyl-sulphamoyl, N,N-dimethyl-sulphamoyl and N,N-diethyl-sulphamoyl.

Suitable aryloxy radicals are, for example, phenoxy and naphthoxy and their derivatives substituted in the aromatic ring.

Suitable aralkoxy radicals are, for example, phenylmethoxy, phenylethoxy, phenylpropyl-(2,2)-oxy and possibly their derivatives substituted in the phenyl nucleus.

The carboxylic acid aralkyl ester substituent is, for example, carbobenzoxy, carbo-α-phenyl-ethyloxy, carbo-β-phenyl-ethyloxy, carbo-γ-phenyl-n-propyloxy and their derivatives substituted in the phenyl nucleus.

A carboxylic acid aryl ester is, for example, the carboxylic acid phenyl ester.

An aryloxy-alkyl substituent is, for example, the phenoxymethyl radical which may be substituted in the phenyl nucleus.

Suitable anionic radicals $A^-$ are the organic and inorganic anions commonly found in basic dyestuffs; examples are chloride, bromide, iodide, carbonate, bicarbonate, $CH_3SO_4^-$, $C_2H_5SO_4^-$, p-toluene-sulphonate, $HSO_4^-$, $SO_4^{--}$, disulphate, aminosulphate, methane-sulphonate, benzene-sulphonate, p-chlorobenzene-sulphonate, dihydrogen phosphate, phosphate, phosphomolybdate, phosphotungstomolybdate, acetate, chloroacetate, formate, propionate, lactate, crotonate, benzoate, $NO_3^-$, perchlorate, $ZnCl_3^-$; the anions of saturated or unsaturated aliphatic dicarboxylic acids, such as malonic acid, maleic acid, citric acid, tartaric acid, oxalic acid, itaconic acid, succinic acid, glutaric acid, adipic acid, pimelic acid and suberic acid, as well as the anions of other organic monobasic acids with 4–30 carbon atoms. Colourless anions are preferred; for dyeing from an aqueous medium, those anions are preferred which do not too strongly impair the solubility of the dyestuff in water. For dyeing from organic solvents, those anions are also often preferred which further the solubility of the dyestuff in organic solvents or at least, do not adversely affect it.

Alkenyl primarily stands for allyl and its methyl substitution products.

Preferred dyestuffs according to the invention have the formula

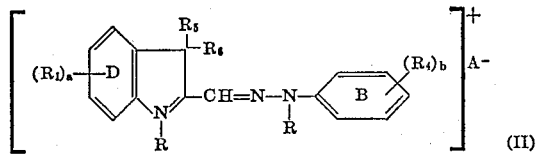

(II)

in which a, b, $R_1$, $R_2$, $R_4$, $R_5$, $R_6$ and $A^-$ have the same meaning as above;

R stands for alkyl which may be substituted by lower carboalkoxy or lower alkoxy or may close an optionally substituted ring in the o-position to the ring B; or for cycloalkyl, aralkyl or lower alkenyl; and in which the rings B and D may be fused with carbocyclic rings.

A particularly preferred group among the hydrazone dyestuffs according to the invention are those of the general formula

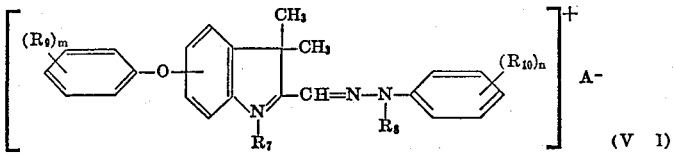

(III)

in which $A^-$ has the same meaning as above;
$R_7$ stands for methyl, ethyl or benzyl;
$R_8$ stands for lower alkyl;
$R_9$ stands for identical or different methyl, ethyl, tert.-butyl, cyclohexyl, hydroxy, methoxy, ethoxy, acetylamino, nitro groups or for chlorine atoms;
$R_{10}$ stands for identical or different methyl, ethyl, cyclohexyl, methoxy, ethoxy, acetylamino, carbomethoxy, carboethoxy, carbamoyl, N-methyl-N-phenyl-carbamoyl, N-ethyl-N-phenyl-carbamoyl, sulphamoyl, methylsulphonyl, phenylsulphonyl, nitro, cyano, trifluoromethyl groups or for chlorine, bromine and/or fluorine atoms;
m stands for the numbers 0, 1, 2 or 3; and
n stands for the numbers 0, 1, 2 or 3.

A particularly preferred group has the general formula

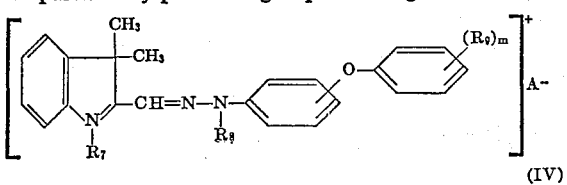

(IV)

in which $R_7$, $R_8$, $R_9$, m and $A^-$ have the same meaning as above.

An outstanding group comprises dyestuffs of the general formula

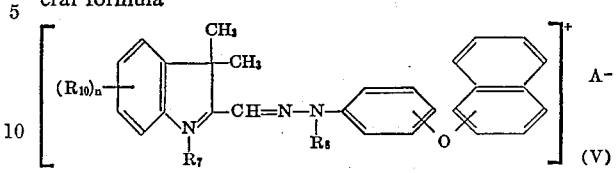

(V)

in which $R_7$, $R_8$, $R_{10}$, n and $A^-$ have the same meaning as above.

A preferred group of hydrazone dyestuffs according to the invention has the general formula

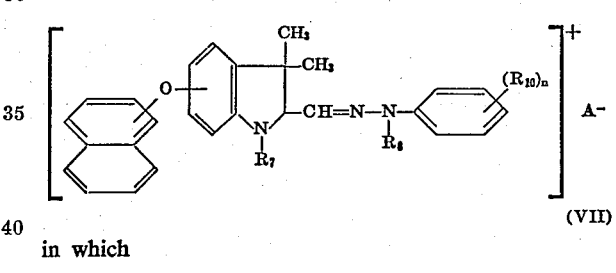

(VI)

in which $R_7$, $R_8$, $R_9$, $R_{10}$, m, n and $A^-$ have the same meaning as above.

Preferred dyestuffs are also those of the general formula

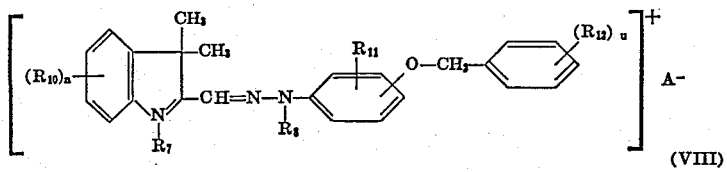

(VII)

in which $R_7$, $R_8$, $R_{10}$, n and $A^-$ have the same meaning as above.

A group of preferred hydrazone dyestuffs according to the invention has the general formula

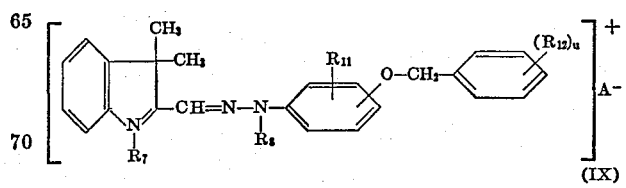

(VIII)

in which $R_7$, $R_8$, $R_{10}$, n and $A^-$ have the same meaning as above;
$R_{11}$ means hydrogen, methyl, ethyl, methoxy, ethoxy or chlorine;
$R_{12}$ means identical or different methyl and/or chlorine substituents; and
u means the numbers 0, 1, 2 or 3.

Particularly preferred hydrazone dyestuffs are those of the General Formula IX (IX)

in which $R_7$, $R_8$, $R_{11}$, $R_{12}$, u and $A^-$ have the same meaning as above.

Hydrazone dyestuffs which are particularly preferred have the Formula X

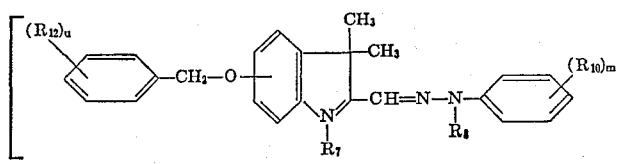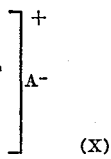

(X)

$R_7$, $R_8$, $R_{10}$, $R_{12}$, $m$, $u$ and $A^-$ have the same meaning as above.

Preferred hydrazone dyestuffs according to the invention have the General Formula XI

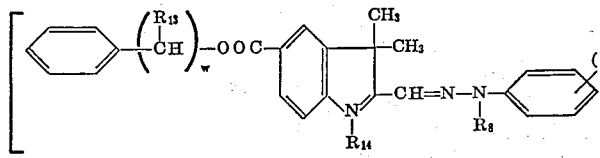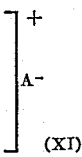

(XI)

in which $R_8$, $R_{10}$, $n$ and $A^-$ have the same meaning as above;
$R_{13}$ means hydrogen or methyl;
$R_{14}$ means methyl or ethyl; and
$w$ means the numbers 1, 2 or 3.

Dyestuffs of the Formulae III to XI in which $R_8$ means methyl are particularly suitable.

Particularly preferred dyestuffs are also those of the Formulae III to XI in which $R_7$ or $R_{14}$ are methyl, and also those in which $R_8$ as well as $R_7$ or $R_{14}$ are methyl.

Those hydrazone dyestuffs according to the invention are particularly preferred in which the anion $A^-$ is the formate, acetate, lactate, succinate, itaconate or maleate anion, or is the anion of an aliphatic dicarboxylic acid such as succinic acid, glutaric acid, adipic acid, pimelic acid or suberic acid. Dyestuffs containing these anions have an especially good solubility in water.

An exchange of dyestuff anions for other dyestuff anions can be carried out by treating the basic dyestuff with acid-binding agents such as sodium carbonate, potassium carbonate, ammonium carbonate, magnesium carbonate, sodium hydroxide, potassium hydroxide, ammonia and silver oxide, possibly in an aqueous medium, to form the dyestuff onium base (or the carbinol base), and treating the latter with anion-yielding agents, these anions being different from those of the basic dyestuff used. The preferred anions to be introduced are the formate, acetate and lactate.

The dyestuffs according to the invention have particular importance for dyeing from chlorinated hydrocarbons when the anion $A^-$ in the Formulae III to XI is the anion of a monobasic organic acid with 4–30 carbon atoms.

The hydrazine dyestuffs of the formula

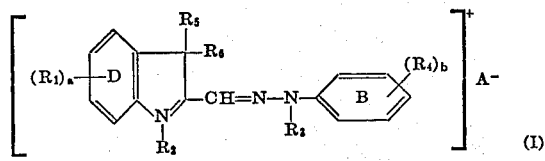

(I)

in which $R_1$ stands for halogen, lower alkyl, cycloalkyl, aralkyl, lower alkoxy, nitro, carboalkoxy, cyano, acyl, acylamino, amino, carbamoyl, N-alkyl-carbamoyl, N,N-dialkyl-carbamoyl, N-alkyl-N-aryl-carbamoyl, sulphamoyl, N - alkyl - sulphamoyl, N,N-dialkylsulphamoyl, alkylsulphonyl, arylsulphonyl, trifluoromethyl, or for aryloxy, aralkoxy, carboxylic acid aralkyl ester, carboxylic acid aryl ester, or for aryloxy-alkyl;

$R_4$ stands for halogen, lower alkyl, cycloalkyl, aralkyl, lower alkoxy, nitro, carbalkoxy, cyano, acyl, acylamino, amino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkylsulphamoyl, alkylsulphonyl, arylsulphonyl, trifluoromethyl, or for aryloxy, aralkoxy, carboxylic acid aralkyl ester, carboxylic acid aryl ester, or for aryloxy-alkyl; and at least one of the substituents $R_1$ and $R_4$ represents aryloxy, aralkyloxy, carboxylic acid aralkyl ester, carboxylic acid aryl ester or aryloxy-alkyl; $R_2$ stand for lower alkyl, cycloalkyl, aralkyl or aryl; $R_3$ stands for hydrogen; alkyl which may be substituted by lower carboalkoxy or lower alkoxy or may close an optionally substituted ring in the o-position of the ring B; or for cycloalkyl, aralkyl or lower alkenyl;

$R_5$ stands for lower alkyl, aralkyl or cycloalkyl;
$R_6$ stands for lower alkyl, aralkyl or cycloalkyl;
$a$ stands for the numbers 0, 1, 2 and 3;
$b$ stands for the numbers 0, 1, 2 or 3; and
$A^-$ stands for an anion; and
in which the rings B and D may be fused with carbocyclic rings, and the aromatic carbocyclic rings of the dyestuff may contain further non-ionic substituents, are prepared by protonising azo bases of the formula

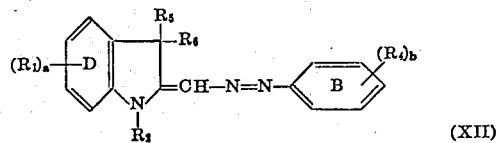

(XII)

in which $a$, $b$, B, D, $R_1$, $R_2$, $R_4$, $R_5$ and $R_6$ have the same meaning as above, or by treating them with a quaternising agent.

The dyestuffs of the Formulae II to XI can be prepared in the same way.

Azo bases of the Formula XII can be prepared by diazotising in known manner amines of the formula

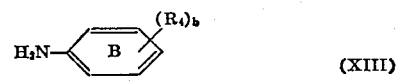

(XIII)

in which $b$, B and $R_4$ have the same meaning as above, coupling the diazo compound with compounds of the formula

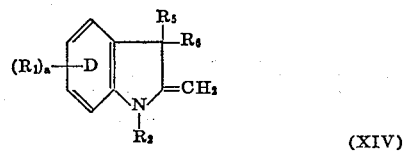

(XIV)

in which $a$, D, $R_1$, $R_2$, $R_5$ and $R_6$ have the same meaning as above, and treating the resultant coupling product with alkali in known manner.

The coupling products of the Formula XII carry in an acidic medium a hydrogen atom in the position $R_3$:

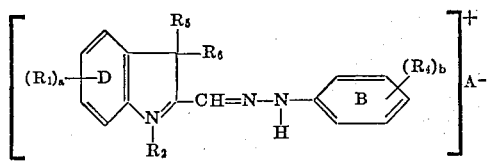

Alkylation can be carried out by heating a solution or suspension of a compond of the Formula XII in an inert medium with the alkylating product to 60–150° C., preferably 80–120° C. The alkylating agent may also be used in excess as solvent.

Suitable inert media are, for example, organic liquids, such as benzine, ligroin, cyclohexane, benzene, toluene, chloroform, chlorobenzene and dichlorobenzene, nitrobenzene, tetralin, dioxan and dimethyl formamide.

Suitable alkylating agents are, for example, dimethyl sulphate, diethyl sulphate, di-n-butyl sulphate, di-iso-amyl sulphate, dimethyl pyrosulphate; benzene-sulphonic acid methyl, ethyl, n-propyl, isopropyl and isobutyl ester; toluene-sulphonic acid methyl, ethyl, n-propyl, isopropyl and isobutyl ester; methyliodide, ethyl iodide, n-butyl bromide, allyl bromide; 2-chloro- and 2-bromo-diethyl ether; as well as chloro- and bromo-acetic acid esters such as chloro- and bromo-acetic acid ethyl ester.

The alkylation can also be carried out in the presence of alkaline agents, especially in the presence of tertiary amines which carry space-filling substituents on the nitrogen atom, according to Belgian patent specification No. 735,565. Triisopropanolamine is a particularly suitable amine with space-filling substituents.

Examples of amine components of the Formula XIII are:

4-amino-diphenyl ether
4-amino-4′-methyl-diphenyl ether
4-amino-4′-ethyl-diphenyl ether
4-amino-4′-tert.-butyl-diphenyl ether
4-amino-4′-cyclohexyl-diphenyl ether
4-amino-2′-methyl-diphenyl ether
4-amino-3′-methyl-diphenyl ether
4-amino-4′-methoxy-diphenyl ether
4-amino-3′-methoxy-diphenyl ether
4-amino-4′-ethoxy-diphenyl ether
4-amino-4′-acetylamino-diphenyl ether
4-amino-4′-hydroxy-diphenyl ether
4-amino-4′-nitro-diphenyl ether
4-amino-4′-chloro-diphenyl ether
4-amino-2′-chloro-diphenyl ether
4-amino-3′-chloro-diphenyl ether
4-aminophenyl-α-naphthyl ether
4-aminophenyl-β-naphthyl ether
4-amino-2′,3′,5′-trimethyl-diphenyl ether
2-amino-diphenyl ether
4-aminophenyl-benzyl ether
3-aminophenyl-benzyl ether
2-aminophenyl-benzyl ether
2-aminophenyl-p-methyl-benzyl ether
4-aminophenyl-p-chloro-benzyl ether
4-aminophenyl-o-chloro-benzyl ether
4-aminophenyl-m,p-dichloro-benzyl ether
4-aminophenyl-2′,4′,5′-trichloro-benzyl ether
3-aminophenyl-p-methyl-benzyl ether
3-aminophenyl-p-chloro-benzyl ether
3-aminophenyl-o-chloro-benzyl ether
3-aminophenyl-m,p-dichloro-benzyl ether
3-aminophenyl-2′,4′,5′-trichloro-benzyl ether
2-aminophenyl-p-methyl-benzyl ether
2-aminophenyl-p-chloro-benzyl ether
2-aminophenyl-m,p-dichloro-benzyl ether
2-aminophenyl-2′,4′,5′-trichloro-benzyl ether
4-amino-2-methylphenyl-benzyl ether
5-amino-2-methyl-phenyl-benzyl ether
2-amino-5-methyl-phenyl-benzyl ether
4-amino-2-methoxy-phenyl-benzyl ether
4-amino-3-methoxy-phenyl-benzyl ether
4-amino-3-methyl-phenyl-benzyl ether
4-amino-3-chloro-phenyl-benzyl ether
4-amino-2-chloro-phenyl-benzyl ether
4-amino-2-methyl-phenyl-p-methyl-benzyl ether
5-amino-2-methyl-phenyl-m,p-dichloro-benzyl ether
2-amino-5-methyl-phenyl-p-chloro-benzyl ether
4-amino-2-methoxy-phenyl-p-methyl-benzyl ether
3-amino-3-methyl-phenyl-2′,4′,5′-trichloro-benzyl ether
aniline
p-toluidine
m-toluidine
o-anisidine
m-anisidine
p-anisidine
o-phenetidine
p-phenetidine
4-aminoacetanilide
N-benzoyl-p-phenylene diamine
2,4-dimethoxyaniline
2,5-dimethoxyaniline
3,4-dimethoxyaniline
2-chloro-4-aminoanisole
2,4,5-trimethylaniline
2,3,5-trimethylaniline
5-amino-2-acetylaminoanisole
6-amino-3-methoxy-toluene
3,4-dicyanoaniline
p-sulphanilic acid amide
4-aminobenzamide
4-chloroaniline
4-fluoroaniline
1,2,3,4-tetrahydro-5-amino-naphthalene
4-amino-2,5-diethoxy-benzoic acid anilide
4-amino-2-methyl-5-methoxybenzanilide
4-cyclohexylaniline
2,4-diethoxyaniline
2-aminonaphthalene
1-aminonaphthalene
2-chloroaniline
3-chloroaniline
2,4-dimethoxy-5-chloroaniline
2,4-dichloroaniline
o-nitroaniline
3-nitroaniline
4-nitroaniline
2-methyl-4-nitroaniline
2-nitro-4-methoxyaniline Suitable coupling components of the Formula XIV are, for example:

1,3,3-trimethyl-2-methylene-2,3-dihydroindole
1,3,3,5-tetramethyl-2-methylene-2,3-dihydroindole
1,3,3-trimethyl-5-chloro-2-methylene-2,3-dihydroindole
1,3,3-trimethyl-5-methoxy-2-methylene-2,3-dihydroindole
1,3,3-trimethyl-5-carbomethoxy-2-methylene-2,3-dihydroindole
1,3,3-trimethyl-5-carboethoxy-2-methylene-2,3-dihydroindole
1,3,3-trimethyl-5-cyclohexyl-2-methylene-2,3-dihydroindole
1,3,3-trimethyl-5-benzyl-2-methylene-2,3-dihydroindole
1,3,3-trimethyl-5-nitro-2-methylene-2,3-dihydroindole
1,3,3-trimethyl-7-methyl-2-methylene-2,3-dihydroindole
1,3,3-trimethyl-5-trifluoromethyl-2-methylene-2,3-dihydroindole
1,3,3-trimethyl-7-methoxy-2-methylene-2,3-dihydroindole
1,3,3-trimethyl-7-chloro-2-methylene-2,3-dihydroindole
1-ethyl-3,3-dimethyl-2-methylene-2,3-dihydroindole
1-ethyl-3,3,5-trimethyl-2-methylene-2,3-dihydroindole
1-ethyl-3,3-dimethyl-5-chloro-2-methylene-2,3-dihydroindole 1-ethyl-3,3-dimethyl-5-methoxy-2-methylene-2,3-dihydroindole
1-ethyl-3,3-dimethyl-5-carbomethoxy-2-methylene-2,3-dihydroindole
1-ethyl-3,3-dimethyl-5-carboethoxy-2-methylene-2,3-dihydroindole
1-ethyl-3,3,7-trimethyl-5-cyclohexyl-2-methylene-2,3-dihydroindole
1-ethyl-3,3-dimethyl-5-benzyl-2-methylene-2,3-dihydroindole
1-ethyl-3,3-dimethyl-5-nitro-2-methylene-2,3-dihydroindole
1-benzyl-3,3-dimethyl-2-methylene-2,3-dihydroindole
1-phenyl-3,3-dimethyl-2-methylene-2,3-dihydroindole
1,3,3-trimethyl-5-benzyloxy-2-methylene-2,3-dihydroindole
1-ethyl-3,3-dimethyl-5-benzyloxy-2-methylene-2,3-dihydroindole
1,3,3-trimethyl-7-benzyl-2-methylene-2,3-dihydroindole
1,3,3-trimethyl-4-benzyloxy-2-methylene-2,3-dihydroindole
1,3,3-trimethyl-6-benzyloxy-2-methylene-2,3-dihydroindole
1,3,3-trimethyl-7-benzyloxy-2-methylene-2,3-dihydroindole
1,3,3-trimethyl-5-(p-methylbenzyloxy)-2-methylene-2,3-dihydroindole
1,3,3-trimethyl-5-(o-methylbenzyloxy)-2-methylene-2,3-dihydroindole
1,3,3-trimethyl-7-(p-chlorobenzyloxy)-2-methylene-2,3-dihydroindole
1,3,3-trimethyl-5-methyl-7-benzyloxy-2-methylene-2,3-dihydroindole
1,3,3-trimethyl-4-methoxy-5-benzyloxy-2-methylene-2,3-dihydroindole
1,3,3-trimethyl-6-methoxy-5-benzyloxy-2-methylene-2,3-dihydroindole
1,3,3-trimethyl-5-methyl-4-benzyloxy-2-methylene-2,3-dihydroindole
1,3,3-trimethyl-5-methyl-6-benzyloxy-2-methylene-2,3-dihydroindole
1,3,3-trimethyl-7-(p-methylbenzyloxy)-2-methylene-2,3-dihydroindole
1,3,3-trimethyl-7-(o-chlorobenzyloxy)-2-methylene-2,3-dihydroindole
1,3,3-trimethyl-5-benzyloxy-7-methyl-2-methylene-2,3-dihydroindole
1,3,3-trimethyl-5-methyl-7-(p-methylbenzyloxy)-2-methylene-2,3-dihydroindole
1,3,3-trimethyl-5-phenoxy-2-methylene-2,3-dihydroindole
1,3,3-trimethyl-7-phenoxy-2-methylene-2,3-dihydroindole
1,3,3-trimethyl-5-(4'-methylphenoxy)-2-methylene-2,3-dihydroindole
1,3,3-trimethyl-5-(4'-methoxyphenoxy)-2-methylene-2,3-dihydroindole
1,3,3-trimethyl-7-(4'-methoxyphenoxy)-2-methylene-2,3-dihydroindole
1,3,3-trimethyl-5-(4'-chlorophenoxy)-2-methylene-2,3-dihydroindole
1,3,3-trimethyl-7-(3'-methylphenoxy)-2-methylene-2,3-dihydroindole
1,3,3-trimethyl-5-(3'-methoxyphenoxy)-2-methylene-2,3-dihydroindole
1,3,3-trimethyl-5-α-naphthyloxy-2-methylene-2,3-dihydroindole
1,3,3-trimethyl-5-(4'-ethylphenoxy)-2-methylene-2,3-dihydroindole
1,3,3-trimethyl-5-carbobenzoxy-2-methylene-2,3-dihydroindole
1,3,3-trimethyl-5-carbo-β-phenylethoxy-2-methylene-2,3-dihydroindole
1,3,3-trimethyl-5-carbo-α-phenylethoxy-2-methylene-2,3-dihydroindole
1,3,3-trimethyl-5-carbo-γ-phenylpropoxy-2-methylene-2,3-dihydroindole
1,3,3-trimethyl-6,7-benzo-2-methylene-2,3-dihydroindole
1,3,3-trimethyl-6,7-benzo-2-methylene-2,3,3',4',5',6',-hexahydroindole
1,3,3-trimethyl-5-fluoro-2-methylene-2,3-dihydroindole
1,3,3-trimethyl-5-ethoxy-2-methylene-2,3-dihydroindole
1,3,3-trimethyl-7-ethoxy-2-methylene-2,3-dihydroindole
1,3,3-trimethyl-5-cyano-2-methylene-2,3-dihydroindole
1,3,3-trimethyl-5-acetylamino-2-methylene-2,3-dihydroindole
1,3,3-trimethyl-5-methylsulphonyl-2-methylene-2,3-dihydroindole
1,3,3-trimethyl-5-phenylsulphonyl-2-methylene-2,3-dihydroindole
1,3-dimethyl-3-ethyl-2-methylene-2,3-dihydroindole
1,3,3-trimethyl-5-sulphonamido-2-methylene-2,3-dihydroindole
1,3,3-trimethyl-5-carboxylic acid-N-ethylanilide-2-methylene-2,3-dihydroindole
1,3,3-trimethyl-7-ethyl-2-methylene-2,3-dihydroindole
1,3,3-trimethyl-5-chloro-7-methoxy-2-methylene-2,3-dihydroindole
1,3,3-trimethyl-4-chloro-7-methoxy-2-methylene-2,3-dihydroindole
1,3,3-trimethyl-4,6-dicarbomethoxy-2-methylene-2,3-dihydroindole
1,3,3-trimethyl-4,5-dichloro-7-methoxy-2-methylene-2,3-dihydroindole
1,3,3-trimethyl-5-chloro-4,7-dimethoxy-2-methylene-2,3-dihydroindole
1,3,3,4,5,7-hexamethyl-2-methylene-2,3-dihydroindole
1,3,3,4,6,7-hexamethyl-2-methylene-2,3-dihydroindole.

Another possibility of preparing the hydrazone dyestuffs of the Formulae II, III, IV, V, VI, VII, VIII, IX, X and XI is based on the condensation of compounds of the general formula

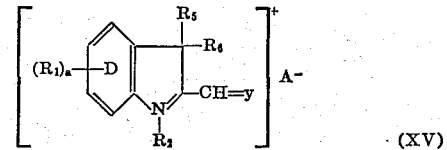

(XV)

with aryl-hydrazines of the general formula

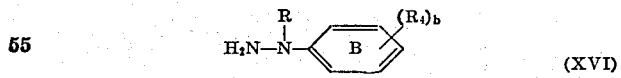

(XVI)

in which $a$, $b$, R, $R_1$, $R_2$, $R_4$, $R_5$, $R_6$ and $A^-$ have the same meaning as above, and $y$ denotes oxygen or a functional derivative of the aldehyde group.

Suitable compounds of the General Formula XV are, for example, azomethines or their salts of the Formula XVII

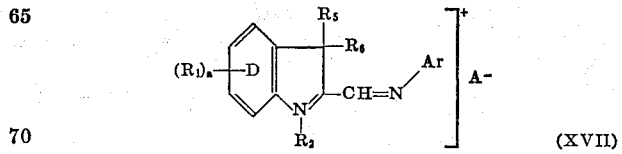

(XVII)

in which $a$, $R_1$, $R_2$, $R_5$, $R_6$, and $A^-$ have the same meaning as above, and =N—Ar means the radical of an aromatic amine.

The rings B or D in the Formulae XV, XVI and XVII may be fused with carbocycles.

The new products are valuable dyestuffs which can be used for dyeing and printing materials of leather, tanned cotton, cellulose, synthetic superpolyamides and superpolyurethanes, as well as for dyeing lignin-containing fibres such as coconut, jute and sisal. They are further suitable for the production of writing liquids, stamping inks, pastes for ball point pens, and they can also be used in offset printing.

Materials suitable for dyeing with the basic dyestuffs of the above General Formulae I to XI are, in particular, loose material, fibres, filaments, ribbons, fabrics or knitted fabrics consisting of polyacrylonitrile or of copolymers of acrylonitrile with other vinyl compounds, such as vinyl chloride, vinylidene chloride, vinyl fluoride, vinyl acetate, vinyl-pyridine, vinyl-imidazole, vinyl alcohol; acrylic acid and methacrylic acid esters and amides; as. dicyanoethylene; or loose material, fibres, filaments, ribbons, fabrics or knitted fabrics consisting of acid-modified aromatic polyesters and acid-modified polyamide fibres. Acid-modified aromatic polyesters are, for example, polycondensation products of sulphoterephthalic acid and ethylene glycol, i.e. polyethylene glycol terephthalates containing sulphonic acid groups (type Dacron 64 of E. I. du Pont de Nemours and Company), such as are described in Belgian patent specification No. 549,179 and U.S. patent specification No. 2,893,816.

Dyeing can be carried out from a weakly acidic bath; it is expedient to introduce the material into the bath of 40–60° C. and then to dye at boiling temperature. It is also possible to dye under pressure at temperatures above 100° C. Furthermore, the dyestuffs can be added to spinning solutions for the production of fibres containing polyacrylonitrile, or they can be applied to the unstretched fibre.

The dyeings with the hydrazone dyestuffs according to the invention corresponding to the Formulae II to XI on materials of polyacrylonitrile are characterised by very good fastness to light, wet processing, rubbing and sublimation and by a high affinity to the fibre. With anionic precipitating agents such as alumina, tannin, phosphotungstic (molybdic) acids, the dyestuffs form pigments which are fast to light and can be used with advantage in paper printing.

The dyestuffs can be used individually or in mixtures. They are well suited for the dyeing of shaped articles consisting of polymers or copolymers of acrylonitrile, as. dicyanoethylene, acid-modified aromatic polyesters or acid-modified synthetic superpolyamides, with the use of chlorinated hydrocarbons as dyebath, if they carry substituents furthering the solubility in chlorinated hydrocarbons, such as e.g. the tert.-butyl group, or if the amine $A^-$ in the Formulae I to XI is the anion of a monobasic organic acid with 4–30 carbon atoms.

Organic acids of this type are, for example: 2-ethyl-caproic acid, lauric acid, oleic acid, linoleic acid; a mixture of aliphatic carboxylic acids with 15–19 carbon atoms (versatic acid 1519); a mixture of aliphatic carboxylic acids with 9–11 carbon atoms (versatic acid 911); coconut-fatty acid first runnings; tetradecanic acid, undecylenic acid, dimethyl-propanic acid, dimethyl-acetic acid; carboxylic acids the carbon chain of which is interrupted by hetero atoms, such as nonylphenol tetraethylene glycol ether-propionic acid, nonylphenol diethylene glycol ether-propionic acid, dodecyl tetraethylene glycol ether-propionic acid, 3-(nonyloxy)-propionic acid, 3-(isotridecyloxy)-propionic acid, 3-(isotridecyloxy)-diethylene glycol ether-propionic acid, ether-propionic acid of the alcohol mixture with 6–10 carbon atoms, nonylphenoxy-acetic acid; aromatic carboxylic acids, such as tert.-butyl-benzoic acid; cycloaliphatic carboxylic acids, such as hexahydrobenzoic acid, cyclohexene-carboxylic acid, abietic acid; and sulphonic acids, such as tetrapropylene-benzenesulphonic acid.

Dyestuffs of the Formulae III to XI in which the anion $A^-$ is the anion of one of the acids mentioned above, are particularly preferred.

If the dyestuffs according to the invention are present in the form of salts of the above monobasic organic acids with 4–30 carbon atoms, it is possible to prepare quite stable concentrated solutions of these dyestuffs in chlorinated hydrocarbons, possibly with the addition of polar organic solvents which are completely miscible with chlorinated hydrocarbons, such as butyrolactone, dimethyl formamide, methanol, dioxan, acetonitrile, methyl ethyl ketone, nitrobenzene, dimethyl sulphoxide, benzonitrile, 2-nitrochlorobenzene.

To prepare such solutions, the dyestuffs according to the invention, in the form of the free bases or as salts of organic acids with 4–30 carbon atoms, are stirred with chlorinated hydrocarbons and monobasic organic acids with 4–30 carbon atoms, possibly with the addition of polar organic solvents which are completely miscible with chlorinated hydrocarbons and possibly at an elevated temperature.

The parts by weight and parts by volume in the examples are in the relation of grams to millilitres.

EXAMPLE 1

15.4 parts by weight 4-aminodiphenyl ether are diazotised in 300 parts by volume of water in the presence of 30.9 parts by weight of 30% hydrochloric acid with a solution of 5.9 g. sodium nitrite in 25 parts by volume of water. The excess of nitrite is destroyed by means of a amidosulphonic acid, 0.5 part by weight of an emulsifier are added, and 14.5 parts by weight 1,3,3-trimethyl-2-methylene 2,3-dihydroindole are poured into the mixture at 5° C. 75 parts by volume of a 20% sodium acetate solution are then added dropwise within 3 hours while the temperature is raised to 10° C. The temperature is subsequently allowed to rise to 18–20° C., and the coupling product is then salted out. It is filtered off with suction in the form of a red powder and then introduced at 80° C. into a stirred mixture of 200 parts by volume chlorobenzene and 200 parts by volume of water while the pH value of the aqueous layer is kept at 9–10 by the dropwise addition of a sodium hydroxide solution. Stirring is continued for 30 minutes, the organic layer is separated, 3.3 parts by weight triisopropanolamine are added and the chlorobenzene is dehydrated by distilling off about 30 ml. of liquid under reduced pressure at about 80° C. 14 parts by weight dimethyl sulphate are then added dropwise at 80° C., and stirring is continued until the methylation is completed; this can be observed by thin layer chromatography. The dyestuff crystallises when the mixture is cooling down. It has the formula

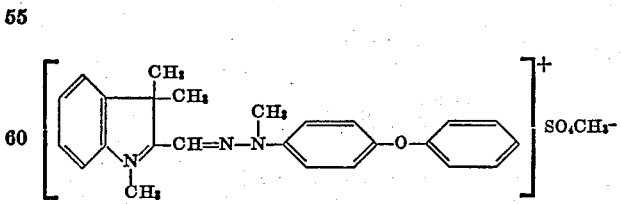

It can be isolated by filtering off the chlorobenzene solution with suction, or by driving off the chlorobenzene with steam and then filtering the aqueous residue from the distillation.

The dyestuff dyes materials of polyacrylonitrile in golden yellow shades of outstanding fastness to light and wet processing.

Equally satisfactory results are achieved when the dimethyl sulphate is replaced with diethyl sulphate or p-toluene-sulphonic acid methyl ester.

Dyestuffs of similar value are obtained by proceeding according to the instructions given in Example 1, starting from the following amine and coupling components:

The specified shades refer to dyeings on polyacrylonitrile. The dyestuffs were redissolved in water and precipitated with sodium chloride, that is to say that they are present in the form of the chloride.

| Coupling component | Amine | Shade |
|---|---|---|
| 1,3,3-trimethyl-5-methyl-2-methylene-2,3-dihydroindole | 4-aminophenyl-benzyl ether | Golden yellow. |
| 1,3,3-trimethyl-5-methoxy-2-methylene-2,3-dihydroindole | do | Yellowish orange. |
| 1,3,3-trimethyl-5-carbomethoxy-2-methylene-2,3-dihydroindole | do | Do. |
| 1,3,3-trimethyl-5-carboethoxy-2-methylene-2,3-dihydroindole | do | Do. |
| 1,3,3-trimethyl-5-cyclohexyl-2-methylene-2,3-dihydroindole | do | Golden yellow. |
| 1,3,3-trimethyl-5-benzyl-2-methylene-2,3-dihydroindole | do | Do. |
| 1,3,3-trimethyl-5-nitro-2-methylene-2,3-dihydroindole | do | Orange. |
| 1,3,3-trimethyl-7-methyl-2-methylene-2,3-dihydroindole | do | Golden yellow. |
| 1,3,3-trimethyl-5-trifluoromethyl-2-methylene-2,3-dihydroindole | do | Do. |
| 1,3,3-trimethyl-7-methoxy-2-methylene-2,3-dihydroindole | do | Do. |
| 1,3,3-trimethyl-7-chloro-2-methylene-2,3-dihydroindole | do | Do. |
| 1,3,3-trimethyl-5-chloro-2-methylene-2,3-dihydroindole | do | Do. |
| 1-ethyl-3,3-dimethyl-2-methylene-2,3-dihydroindole | do | Do. |
| 1-ethyl-3,3-dimethyl-5-methyl-2-methylene-2,3-dihydroindole | do | Do. |
| 1-ethyl-3,3-dimethyl-5-chloro-2-methylene-2,3-dihydroindole | do | Do. |
| 1-ethyl-3,3-dimethyl-5-methoxy-2-methylene-2,3-dihydroindole | do | Yellowish orange. |
| 1-ethyl-3,3-dimethyl-5-carboethoxy-2-methylene-2,3-dihydroindole | do | Do. |
| 1-ethyl-3,3-dimethyl-5-cyclohexyl-2-methylene-2,3-dihydroindole | do | Golden yellow. |
| 1-ethyl-3,3-dimethyl-5-benzyl-2-methylene-2,3-dihydroindole | do | Do. |
| 1-ethyl-3,3-dimethyl-5-nitro-2-methylene-2,3-dihydroindole | do | Orange. |
| 1,3,3-trimethyl-7-benzyl-2-methylene-2,3-dihydroindole | do | Golden yellow. |
| Mixture of 1,3,3-trimethyl-4-methyl-2-methylene-2,3-dihydroindole, and 1,3,3-trimethyl-6-methyl-2-methylene-2,3-dihydroindole | do | Do. |
| 1,3,3-trimethyl-6,7-benzo-2-methylene-2,3,3',4',5',6'-hexahydroindole | do | Orange. |
| 1,3,3-trimethyl-5-fluoro-2-methylene-2,3-dihydroindole | do | Golden yellow. |
| 1,3,3-trimethyl-5-ethoxy-2-methylene-2,3-dihydroindole | do | Yellowish orange. |
| 1,3,3-trimethyl-7-ethoxy-2-methylene-2,3-dihydroindole | do | Golden yellow. |
| 1,3,3-trimethyl-5-cyano-2-methylene-2,3-dihydroindole | do | Do. |
| 1,3,3-trimethyl-5-acetylamino-2-methylene-2,3-dihydroindole | do | Yellowish orange. |
| 1,3,3-trimethyl-5-methylsulphonyl-2-methylene-2,3-dihydroindole | do | Golden yellow. |
| 1,3,3-trimethyl-5-phenylsulphonyl-2-methylene-2,3-dihydroindole | do | Yellowish orange. |
| 1,3-dimethyl-3-ethyl-2-methylene-2,3-dihydroindole | do | Golden yellow. |
| 1,3,3-trimethyl-6,7-benzo-2-methylene-2,3-dihydroindole | do | Orange. |
| 1,3,3-trimethyl-5-sulphonamido-2-methylene-2,3-dihydroindole | do | Golden yellow. |
| 1,3,3-trimethyl-5-carboxamido-2-methylene-2,3-dihydroindole | do | Do. |
| 1,3,3-trimethyl-5-carboxylic acid-ethyl-anilide-2-methylene-2,3-dihydroindole | do | Do. |
| 1,3,3-trimethyl-7-ethyl-2-methylene-2,3-dihyrroindole | do | Do. |
| 1,3,3-trimethyl-5-chloro-7-methoxy-2-methylene-2,3-dihydroindole | do | Do. |
| 1,3,3-trimethyl-4-chloro-7-methoxy-2-methylene-2,3-dihydroindile | do | Do. |
| 1,3,3-trimethyl-4,6-dicarbomethoxy-2-methylene-2,3-dihydroindole | do | Yellowish orange. |
| 1,3,3-trimethyl-4,5-dichloro-7-methoxy-2-methylene-2,3-dihydroindole | do | Do. |
| 1,3,3-trimethyl-5-chloro-4,7-dimethoxy-2-methylene-2,3-dihydroindole | do | Do. |
| 1,3,3,4,5,7-hexamethyl-2-methylene-2,3-dihydroindole | do | Golden yellow. |
| 1,3,3,4,6,7-hexamethyl-2-methylene-2,3-dihydroindole | do | Do. |
| 1,3,3-trimethyl-5-chloro-2-methylene-2,3-dihydroindole | 3-aminophenyl-benzyl ether | Reddish yellow. |
| Do | 2-aminophenyl-benzyl ether | Yellow. |
| 1,3,3-trimethyl-2-methylene-2,3-dihydroindole | do | Do. |
| Do | 4-aminophenyl-p-methyl-benzyl ether | Golden yellow. |
| Do | 4-aminophenyl-p-chloro-benzyl ether | Do. |
| Do | 4-aminophenyl-o-chloro-benzyl ether | Do. |
| Do | 4-aminophenyl-m,p-dichloro-benzyl ether | Do. |
| Do | 3-aminophenyl-p-methyl-benzyl ether | Reddish yellow. |
| Do | 2-aminophenyl-p-methyl-benzyl ether | Yellow. |
| Do | 2-aminophenyl-p-chloro-benzyl ether | Do. |
| Do | 2-aminophenyl-m,p-dichloro-benzyl ether | Do. |
| Do | 4-amino-2-methyl-phenyl-benzyl ether | Golden yellow. |
| Do | 5-amino-2-methyl-phenyl-benzyl ether | Reddish yellow. |
| Do | 2-amino-5-methyl-phenyl-benzyl ether | Yellow. |
| Do | 4-amino-3-methoxy-phenyl-benzyl ether | Golden yellow. |
| Do | 4-amino-2-methoxy-phenyl-benzyl ether | Orange. |
| Do | 4-amino-3-methyl-phenyl-benzyl ether | Golden yellow. |
| Do | 4-amino-3-chloro-phenyl-benzyl ether | Do. |
| Do | 4-amino-2-chloro-phenyl-benzyl ether | Do. |
| Do | 4-amino-2-methyl-phenyl-p-methyl-benzyl ether | Do. |
| Do | 5-amino-2-methyl-phenyl-m,p-dichlorobenzyl ether | Do. |
| Do | 2-amino-5-methyl-phenyl-p-chloro-benzyl ether | Reddish yellow. |
| Do | 4-amino-2-methoxy-phenyl-p-methyl-benzyl ether | Orange. |
| 1,3,3-trimethyl-5-carbomethoxy-2-methylene-2,3-dihydroindole | 2-aminophenyl-benzyl ether | Reddish yellow. |
| 1,3,3-trimethyl-5-methyl-2-methylene-2,3-dihydroindole | do | Yellow. |
| 1,3,3-trimethyl-5-methoxy-2-methylene-2,3-dihydroindole | do | Reddish yellow. |
| 1,3,3-trimethyl-7-methoxy-2-methylene-2,3-dihydroindole | do | Yellow. |
| 1,3,3-trimethyl-5-phenoxy-2-methylene-2,3-dihydroindole | do | Reddish yellow. |
| 1,3,3-trimethyl-5-methyl-2-methylene-2,3-dihydroindole | 4-aminodiphenyl ether | Golden yellow. |
| 1,3,3-trimethyl-5-methoxy-2-methylene-2,3-dihydroindole | do | Yellowish orange. |
| 1,3,3-trimethyl-5-carbomethoxy-2-methylene-2,3-dihydroindole | do | Do. |
| 1,3,3-trimethyl-7-methyl-2-methylene-2,3-dihydroindole | do | Golden yellow. |
| 1,3,3-trimethyl-5-chloro-2-methylene-2,3-dihydroindole | do | Do. |
| 1,3,3-trimethyl-7-ethoxy-2-methylene-2,3-dihydroindole | do | Do. |
| 1,3,3-trimethyl-5-benzyloxy-2-methylene-2,3-dihydroindole | do | Yellowish orange. |
| 1,3,3,4,6,7-hexamethyl-2-methylene-2,3-dihydroindole | do | Golden yellow. |
| 1,3,3-trimethyl-5-chloro-2-methylene-2,3-dihydroindole | 4-amino-2-methoxy-phenyl-benzyl ether | Orange. |
| 1,3,3-trimethyl-5-carbomethoxy-2-methylene-2,3-dihydroindole | do | Reddish orange. |
| 1,3,3-trimethyl-5-methoxy-2-methylene-2,3-dihydroindole | do | Do. |
| 1,3,3-trimethyl-5-nitro-2-methylene-2,3-dihydroindole | do | Scarlet. |
| 1,3,3-trimethyl-5-carbobenzoxy-2-methylene-2,3-dihydroindole | do | Do. |
| 1,3,3-trimethyl-5-methyl-2-methylene-2,3-dihydroindole | do | Orange. |
| 1,3,3-trimethyl-5-methylsulphonyl-2-methylene-2,3-dihydroindole | do | Reddish orange. |
| 1,3,3-trimethyl-2-methylene-2,3-dihydroindole | 2-aminodiphenyl ether | Yellow. |
| 1,3,3-trimethyl-5-chloro-2-methylene-2,3-dihydroindole | do | Do. |
| 1,3,3-trimethyl-5-carbomethoxy-2-methylene-2,3-dihydroindole | do | Reddish yellow. |
| 1,3,3-trimethyl-2-methylene-2,3-dihydroindole | 4-amino-4'-methyl-diphenyl ether | Golden yellow. |
| Do | 4-amino-4'-ethyl-diphenyl ether | Do. |
| Do | 4-amino-4'-tert.-butyl-diphenyl ether | Do. |
| Do | 4-amino-4'-cyclohexyl-diphenyl ether | Do. |
| Do | 4-amino-2'-methyl-diphenyl ether | Do. |
| Do | 4-amino-3'-methyl-diphenyl ether | Do. |
| Do | 4-amino-4'-methoxy-diphenyl ether | Do. |
| Do | 4-amino-3'-methoxy-diphenyl ether | Do. |
| Do | 4-amino-4'-ethoxy-diphenyl ether | Do. |

TABLE—Continued

| Coupling component | Amine | Shade |
|---|---|---|
| 1,3,3-trimethyl-2-methylene-2,3-dihydroindole | 4-amino-4'-acetylamino-diphenyl ether | Yellowish orange. |
| Do | 4-amino-4'-nitro-diphenyl ether | Do. |
| Do | 4-amino-4'-chloro-diphenyl ether | Golden yellow. |
| Do | 4-amino-2'-chloro-diphenyl ether | Do. |
| Do | 4-amino-3'-chloro-diphenyl ether | Do. |
| Do | 4-aminophenyl-α-naphthyl ether | Do. |
| Do | 4-aminophenyl-β-naphthyl ether | Do. |
| Do | 4-amino-2',3',5'-trimethyl-diphenyl ether | Do. |
| Do | 4-amino-4'-ethyldiphenyl ether | Do. |
| 1,3,3-trimethyl-5-chloro-2-methylene-2,3-dihydroindole | 4-amino-4'-tert.-butyl-diphenyl ether | Do. |
| Do | 4-amino-4'-methoxy-diphenyl ether | Do. |
| Do | 4-aminophenyl-α-naphthyl ether | Do. |
| Do | 4-amino-4'-tert.-butyl-diphenyl ether | Yellowish orange. |
| 1,3,3-trimethyl-5-carbomethoxy-2-methylene-2,3-dihydroindole | 4-aminodiphenyl-methane | Golden yellow. |
| 1,3,3-trimethyl-5-benzyloxy-2-methylene-2,3-dihydroindole | Aniline | Do. |
| Do | p-Toluidine | Do. |
| Do | m-Toluidine | Do. |
| Do | o-Anisidine | Yellow. |
| Do | p-Anisidine | Golden yellow. |
| Do | o-Phenetidine | Yellow. |
| Do | p-Phenetidine | Golden yellow. |
| Do | 4-Aminoacetanilide | Yellowish orange. |
| Do | N-benzoyl-p-phenylene-diamine | Do. |
| Do | 2,4-dimethoxy-aniline | Golden yellow. |
| Do | 2,5-dimethoxy-aniline | Do. |
| Do | 3,4-dimethoxy-aniline | Reddish orange. |
| Do | 2-chloro-4-amino-anisole | Yellowish orange. |
| Do | 2,4,5-trimethyl-aniline | Golden yellow. |
| Do | 2,3,5-trimethyl-aniline | Do. |
| Do | 5-amino-2-acetylamino-anisole | Reddish orange. |
| Do | 6-amino-3-methoxytoluene | Golden yellow. |
| Do | 3,4-dicyano-aniline | Orange. |
| Do | p-Sulphanilic acid amide | Golden yellow. |
| Do | 4-aminobenzamide | Do. |
| Do | 4-chloroaniline | Do. |
| Do | 4-fluoroaniline | Do. |
| Do | 1,2,3,4-tetrahydro-5-aminonaphthalene | Do. |
| Do | 4-amino-2,5-diethoxy-benzoic acid anilide | Scarlet. |
| Do | 4-amino-2-methyl-5-methoxy-benzanilide | Orange. |
| Do | 4-cyclohexyl-aniline | Golden yellow. |
| Do | 2,4-diethoxy-aniline | Do. |
| Do | 2-aminonaphthalene | Do. |
| Do | 3,4-diisopropyloxy-aniline | Reddish orange. |
| Do | 3,4-diisopropyloxy-aniline | Golden yellow. |
| 1,3,3-trimethyl-5-phenoxy-2-methylene-2,3-dihydroindole | p-Anisidine | Yellow. |
| Do | o-Anisidine | Golden yellow. |
| Do | p-Toluidine | Reddish orange. |
| Do | 3,4-dimethoxy-aniline | Do. |
| Do | 3,4-diisopropyloxy-aniline | Orange. |
| 1,3,3-trimethyl-7-phenoxy-2-methylene-2,3-dihydroindole | do | Do. |
| Do | 3,4-dimethoxy-aniline | Yellow. |
| Do | o-Anisidine | Golden yellow. |
| Do | p-Anisidine | Do. |
| 1,3,3-trimethyl-7-benzyloxy-2-methylene-2,3-dihydroindole | do | Yellow. |
| Do | o-Anisidine | Orange. |
| Do | 3,4-dimethoxy-aniline | Golden yellow. |
| 1-ethyl-3,3-dimethyl-5-phenoxy-2-methylene-2,3-dihydroindole | p-Anisidine | Yellowish orange. |
| 1,3,3-trimethyl-5-carbobenzoxy-2-methylene-2,3-dihydroindole | do | Golden yellow. |
| Do | p-Toluidine | Yellowish orange. |
| 1,3,3-trimethyl-5-carbo-β-phenylethoxy-2-methylene-2,3-dihydroindole | p-Anisidine | Do. |
| 1,3,3-trimethyl-5-carbo-α-phenylethoxy-2-methylene-2,3-dihydroindole | do | Do. |
| 1,3,3-trimethyl-5-carbo-γ-phenylpropoxy-2-methylene-2,3-dihydroindole | do | Golden yellow. |
| 1-benzyl-3,3-dimethyl-2-methylene-2,3-dihydroindole | 4-aminophenyl-benzyl ether | Do. |
| 1,3,3-trimethyl-5-(o-chlorobenzyloxy)-2-methylene-2,3-dihydroindole | p-Anisidine | Do. |
| 1,3,3-trimethyl-7-(p-chlorobenzyloxy)-2-methylene-2,3-dihydroindole | do | Do. |
| 1,3,3-trimethyl-5-methyl-7-benzyloxy-2-methylene-2,3-dihydroindole | do | |
| Mixture of 1,3,3-trimethyl-4-methoxy-5-benzyloxy-2-methylene-2,3-dihydroindole and 1,3,3-trimethyl-6-methoxy-5-benzyloxy-2-methylene-2,3-dihydroindole | do | Orange. |
| Mixture of 1,3,3-trimethyl-5-methyl-4-benzyloxy-2-methylene-2,3-dihydroindole and 1,3,3-trimethyl-5-methyl-6-benzyloxy-2-methylene-2,3-dihydroindole | do | Golden yellow. |
| 1,3,3-trimethyl-7-(p-methylbenzyloxy)-2-methylene-2,3-dihydroindole | do | Do. |
| 1,3,3-trimethyl-7-(o-chlorobenzyloxy)-2-methylene-2,3-dihydroindole | do | Do. |
| 1,3,3-trimethyl-5-benzyloxy-7-methyl-2-methylene-2,3-dihydroindole | do | Do. |
| 1,3,3-trimethyl-5-methyl-7-(p-methylbenzyloxy)-2-methylene-2,3-dihydroindole | do | Do. |
| 1,3,3-trimethyl-5-(4'-methylphenoxy)-2-methylene-2,3-dihydroindole | do | Do. |
| 1,3,3-trimethyl-5-(4'-methoxyphenoxy)-2-methylene-2,3-dihydroindole | do | Do. |
| 1,3,3-trimethyl-7-(4'-methoxyphenoxy)-2-methylene-2,3-dihydroindole | do | Do. |
| 1,3,3-trimethyl-5-(4'-chlorophenoxy)-2-methylene-2,3-dihydroindole | do | Do. |
| 1,3,3-trimethyl-7-(3'-methylphenoxy)-2-methylene-2,3-dihydroindole | do | Do. |
| 1,3,3-trimethyl-5-(3'-methoxyphenoxy)-2-methylene-2,3-dihydroindole | do | Do. |
| 1,3,3-trimethyl-5-α-naphthyloxy-2-methylene-2,3-dihydroindole | do | Do. |
| 1,3,3-trimethyl-5-(4'-ethylphenoxy)-2-methylene-2,3-dihydroindole | do | Do. |
| 1,3,3-trimethyl-5-(p-methoxyphenoxy)-2-methylene-2,3-dihydroindole | 4-amino-4'-methoxy-diphenyl ether | Do. |

EXAMPLE 2

33.2 parts by weight 4-aminophenyl-benzyl ether are diazotised in 500 parts by volume of water in the presence of 61.7 parts by weight of 30% hydrochloric acid with a solution of 11.7 parts by weight sodium nitrite in 50 parts by volume of water. The excess of nitrite is destroyed by means of amidosulphonic acid, 1 part by weight of an emulsifier is added, and 29 parts by weight 1,3,3-trimethyl-2-methylene-2,3-dihydroindole are poured into the mixture at 5° C. 150 parts by volume of a 20% sodium acetate solution are then added dropwise within 3 hours while the temperature is rased to 10° C. The temperature is subsequently allowed to rise to 18–20° C., and the hydrochloride of the formula

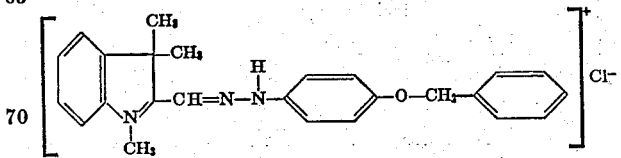

is then salted out with sodium chloride. The product dyes fabrics of polyacrylonitrile polymers from an acidic bath in orange shades.

EXAMPLE 3

25 parts by weight of the dyestuff obtained according to Example 2 are suspended with 3 parts by weight magnesium oxide in 200 parts by volume chloroform. 10 parts by weight dimethyl sulphate are then added, and the mixture is stirred at 60° C. for 3 hours. 200 parts by weight of 5% hydrochloric acid are then added, and the chloroform is distilled off.

The dyestuff of the formula

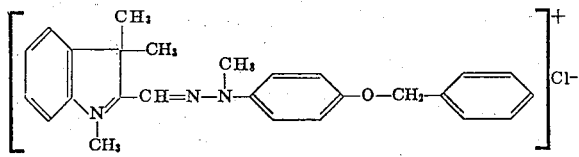

is filteed off with suction, washed with a dilute sodium chloride solution and dried. It dyes polyacrylonitrile in clear golden yellow shades of outstanding fastness to light and wet processing.

EXAMPLE 4

59.8 g. of the dyestuff described in Example 1 and corresponding to the formula

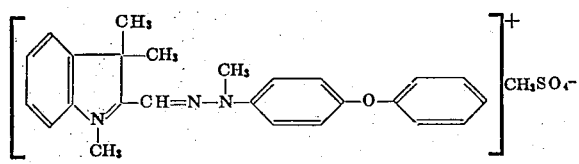

are dissolved in 800 ml. of water at 98–100° C., and this solution is added dropwise within 6 hours to a solution of 108 g. of anhydrous sodium carbonate in 680 ml. of water, which is kept at 0° C. by the addition of ice. Stirring is then continued at 0° C. for 1 hour, the product is filtered off with suction, washed with water until free from chloride, and the resultant yellowish powdery product (onium base or carbinol base) is stirred at room temperature in a mixture of 200 ml. of water and 19 g. of lactic acid (85%) until it has practically completely dissolved. Any residual small amount of undissolved matter is filtered off with suction and the filtrate evaporated to dryness at 30° C. and 20 mm. Hg. Residue: 55 g. of an orange-coloured dyestuff of the formula

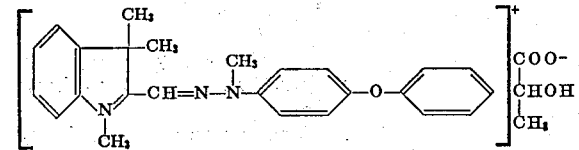

which dyes fabrics of polyacrylonitrile, acid-modified polyesters such as Dacron 64® in a golden yellow shade of outstanding fastness to light and wet processing.

Example 5

A fabric of polyacrylonitrile is printed with a printing paste prepared in the following way:

330 parts by weight of hot water are poured over 30 parts by weight of the dyestuff described in Example 3, 50 parts by weight thiodiethylene glycol, 30 parts by weight cyclohexanol and 30 parts by weight of 30% acetic acid, and the resultant solution is added to 500 parts by weight of crystal gum (gum arabic as thickening agent). Finally, 30 parts by weight of a zinc nitrate solution are added. The print obtained is dried, steamed for 30 minutes and subsequently rinsed. A golden yellow print of very good fastness properties is obtained.

EXAMPLE 6

Acid-modified polyglycol terephthalate fibres are introduced at 20° C. in a liquor ratio of 1:40 into an aqueous bath which contains, per litre, 3–10 g. sodium sulphate, 0.1–1 g. oleyl polyglycol ether (50 mol ethylene oxide), 0.15 g. dimethyl-benzyl dodecylammonium chloride and 0.15 g. of the dyestuff described in Example 3, and which has been adjusted with acetic acid to pH 4–5. The bath is heated to 100° C. within 30 minutes and kept at the same temperature for 60 minutes. The fibres are subsequently rinsed and dried. A golden yellow dyeing of very good fastness properties is obtained.

EXAMPLE 7

Polyacrylonitrile fibres are introduced at 40° C. in a liquor ratio of 1:40 into an aqueous bath containing, per litre, 0.75 g. of 30% acetic acid, 0.38 g. sodium acetate and 0.15 g. of a dyestuff the preparation of which is described in Example 3. The bath is heated to boiling temperature within 20–30 minutes and kept at the same temperature for 30–60 minutes. After rinsing and drying, there is obtained a golden yellow dyeing of very good fastness properties.

EXAMPLE 8

From 15 parts by weight of the dyestuff mentioned in Example 3, 15 parts by weight polyacrylonitrile and 70 parts by weight dimethyl formamide there is prepared a stock solution which is added to a conventional spinning solution of polyacrylonitrile and spun in the usual way. A golden yellow dyeing of very good fastness properties is obtained.

EXAMPLE 9

Acid-modified synthetic polyamide fibres are introduced at 40° C. in a liquor ratio of 1:40 into an aqueous bath which contains, per litre, 10 g. sodium acetate, 1–5 g. oleyl polyglycol ether (50 mol ethylene oxide) and 0.3 g. of the dyestuff mentioned in the table of Example 1 and obtained from 1,3,3-trimethyl - 5 - (p-methoxyphenoxy)-2-methylene-2,3-dihydroindole and 4-amino-4'-methoxydiphenyl ether

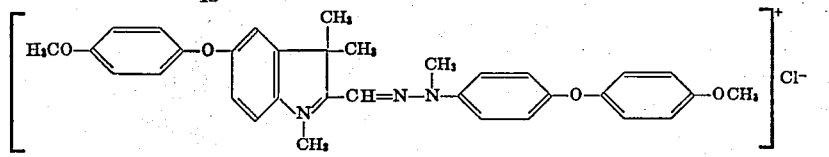

the bath having been adjusted with acetic acid to pH 4–5. The bath is heated to 98° C. within 30 minutes and kept at the same temperature for 60 minutes. The fibres are subsequently rinsed and dried. A golden yellow dyeing of good fastness properties is obtained.

EXAMPLE 10

Polyacrylonitrile fibres are introduced in a liquor ratio of 1:10 into a perchloroethylene bath containing, per litre, 1 g. oleic acid ethanolamide, 1 g. of the reaction product of 1 mol oleyl alcohol with 20 mol ethylene oxide, 8 g. of water and 1 g. glacial acetic acid as well as 1 g. of the dyestuff mentioned in the Table of Example 1 and obtained from 1,3,3-trimethyl-2-methylene-2,3-dihydroindole and 4-amino-4'-tert.-butyl-diphenyl ether

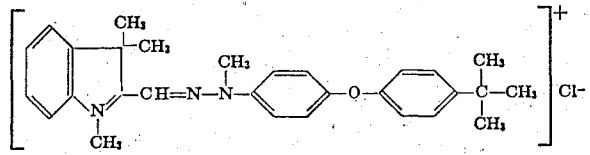

The bath is heated in a closed dyeing apparatus to 100° C. within 60 minutes while the liquor is vigorously agitated. The fibres are subsequently rinsed and dried. A golden yellow dyeing of good fastness properties is obtained.

EXAMPLE 11

The dyestuff of Example 1 is converted into the dyestuff base in the usual way. 25 parts of this dyestuff base are introduced into a mixture of 150 parts perchloroethylene and 65 parts butyrolactone, 15 parts 2-ethylcaproic acid are added, and the mixture is heated to 50° C.; the dyestuff dissolves with an orange colour. The solution is stirred at 50° C. for 1 hour, cooled and subsequently filtered; virtually no residue remains on the filter. A stable solution is obtained which is eminently suitable for the dyeing of polyacrylonitrile yarns from a perchloroethylene solution.

EXAMPLE 12

50 parts of fibre yarn of anion-modified polyacrylonitrile are introduced at 22° C. into a dyebath consisting of a mixture of 4 parts of the dyestuff solution in perchloroethylene described in Example 11, 4 parts oleic acid ethanolamide, 4 parts of the reaction product of 1 mol oleyl alcohol with 20 mol ethylene oxide, 1 part glacial acetic acid and 8 parts of water in 983 parts perchloroethylene. The bath is heated to 100° C. within 30 minutes while the liquor is vigorously circulating, and it is kept at the same temperature for one hour. After this period of time, the liquor is separated and the yarn is freed from any adhering solvent in an air current. A golden yellow dyeing is obtained.

EXAMPLE 13

4.5 parts by weight 4-nitroso-3-ethoxy-diethyl-aniline, 5.6 parts by weight 1,3,3-trimethyl-5-benzyloxy-2-methylene-2,3-dihydroindole, 10 parts by volume glacial acetic acid and 5 parts by volume acetic anhydride are mixed with one another. A blue melt of the azomethine is obtained in an exothermic reaction. After stirring for a short time, 3.1 parts by weight N-amino-2-methyl-2,3-dihydroindole are added, and stirring is continued for a few hours. A dyestuff is obtained which presumably corresponds to the formula

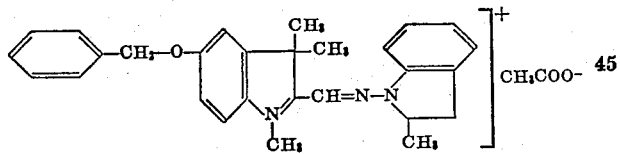

and dyes polyacrylonitrile in golden yellow shades.

EXAMPLE 14

13.8 parts by weight o-nitro-aniline are diazotised in known manner.

Coupling with 25.5 parts by weight 1,3,3-trimethyl-2-methylene-7-benzyloxy-2,3-dihydroindole yields the dyestuff of the formula

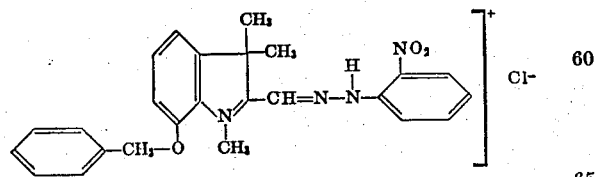

which dyes polyacrylonitrile in yellow shades of good fastness properties.

Patent claims:
1. Hydrazone dystuff of the formula

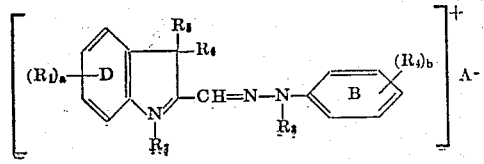

wherein
$R_1$ is halo, alkyl of 1–5 carbon atoms, cyclohexyl, phenylmethyl, phenylethyl, phenylpropyl-(2,2), alkoxy of 1–4 carbon atoms, nitro, carboalkoxy of 1–5 carbon atoms, cyano, acetyl, propionyl, toluyl, benzoyl, formylamino, acetylamino, n - propionylamino, benzoylamino, 4-chlorobenzoylamino, 4-methylbenzoylamino, amino, carbamoyl, N-alkyl-carbamoyl of 1–4 carbon atoms in the alkyl portion, N,N-diethylcarbamoyl, N-methyl-N-ethyl-carbamoyl, N-methyl - N - phenylcarbamoyl, N-ethyl-N-phenylcarbamoyl, sulphamoyl, N - methylsulphamoyl, N-ethylsulphamoyl, N,N-dimethylsulphamoyl, N,N - diethylsulphamoyl, methylsulphonyl, ethylsulphonyl, phenylsulphonyl, trifluoromethyl, phenoxy, naphthoxy, phenylmethoxy, phenylethoxy, phenylpropyl - (2,2) - oxy, carbobenzoxy, carbo-α-phenylethoxy, carbo-β-phenyl - ethyloxy, carbo-γ-phenyl-n-propyloxy, carboxylic acid phenyl ester, phenoxymethyl, or any of the last eleven radicals substituted in the phenyl nucleus by alkyl of 1–5 carbon atoms, halo, alkoxy of 1–4 carbon atoms, carboalkoxy of 1–5 carbon atoms, cyano, nitro, or hydroxy;
$R_4$ is halo, alkyl of 1–5 carbon atoms, cyclohexyl, phenylmethyl, phenylethyl, phenylpropyl-(2,2), alkoxy of 1–4 carbon atoms, nitro, carboalkoxy of 1–5 carbon atoms, cyano, acetyl, propionyl, toluyl, benzoyl, formylamino, acetylamino, n - propionylamino, benzoylamino, 4-chlorobenzoylamino, 4 - methylbenzoylamino, amino, carbamoyl, N-alkylcarbamoyl of 1–4 carbon atoms in the alkyl portion, N,N-diethylcarbamoyl, N-methyl-N-ethyl-carbamoyl, N-methyl - N - phenylcarbamoyl, N-ethyl-N-phenylcarbamoyl, sulphamoyl, N - methylsulphamoyl, N-ethylsulphamoyl, N,N-dimethylsulphamoyl, N,N - diethylsulphamoyl, methylsulphonyl, ethylsulphonyl, phenylsulphonyl, trifluoromethyl, alkylphenoxy of 1–5 carbon atoms in the alkyl portion, halophenoxy, alkoxyphenoxy of 1–4 carbon atoms in the alkoxy portion, carboalkoxyphenoxy of 1–5 carbon atoms in the carboalkoxy portion, cyanophenoxy, nitrophenoxy, hydroxyphenoxy, naphthoxy, phenylmethoxy, phenylethoxy, phenylpropyl-(2,2)-oxy, carbobenzoxy, carbo-α - phenylethyloxy, carbo-β-phenyl-ethyloxy, carbo-γ-phenyl-n-propyloxy, carboxylic acid phenyl ester, phenoxymethyl, or any of the last ten radicals substituted in the phenyl nucleus by alkyl of 1–5 carbon atoms, halo, alkoxy of 1–4 carbon atoms, carboalkoxy of 1–5 carbon atoms, cyano, nitro, or hydroxy;

with the proviso that
at least one of $R_1$ and $R_4$ must be one of said phenoxy, naphthoxy, phenylmethoxy, phenylethoxy, carbobenzoxy, carbo-α-phenylethoxy, carbo - β - phenylethyloxy, carbo-γ-phenyl-n-propyloxy, carboxylic acid phenyl ester, phenoxymethyl or their said substituted derivatives;
$R_2$ is alkyl of 1–5 carbon atoms, cyclohexyl, phenylmethyl, phenylethyl, phenylpropyl-(2,2), phenyl, naphthyl, methylphenyl, or chlorophenyl;
$R_3$ is hydrogen, alkyl of 1–5 carbon atoms, carboalkoxyalkyl of 1–5 carbon atoms in each of the carboalkoxy portions and the alkyl portion, alkoxyalkyl of 1–4 carbon atoms in the alkoxy portion and 1–5 carbon atoms in the alkyl portions, cyclohexyl, phenylmethyl, phenylethyl, phenylpropyl-(2,2), allyl, methylallyl, or alkylene when it joins ring B in the o-position to the nitrogen bond to form a closed ring;
$R_5$ and $R_6$ are alkyl of 1–5 carbon atoms, phenylmethyl, phenylethyl, phenylpropyl-(2,2), or cyclohexyl;
$a$ and $b$ are the numbers, 0, 1, 2, or 3;
$A^-$ is an anion;
the rings B and D may be fused with a benzene ring; and the aromatic carbocyclic rings of the above formula may contain one or more substituents selected from the group consisting of chloro, bromo, fluoro, methyl, ethyl, methoxy, carbomethoxy, nitro, nitrilo, 2. Hydrazone dyestuff of the general formula

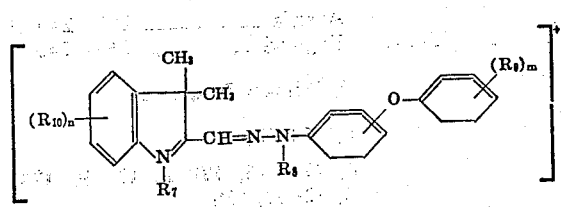

in which $R_7$ stands for methyl, ethyl or benzyl;
$R_8$ stands for alkyl of 1–5 carbon atoms;
$R_9$ stands for hydrogen or for identical or different methyl, ethyl, tert.-butyl, cyclohexyl, hydroxy, methoxy, ethoxy, acetylamino, nitro or chloro;
$R_{10}$ stands for identical or different methyl, ethyl, cyclohexyl, methoxy, ethoxy, acetylamino, carbomethoxy, carboethoxy, carbamoyl, N - methyl-N-phenyl-carbamoyl, N-ethyl-N-phenyl-carbamoyl, sulphamoyl, methylsulphonyl, phenylsulphonyl, nitro, cyano, trifluoromethyl, chloro, bromo, or fluoro;
$m$ stands for the numbers 1, 2 or 3;
$n$ stands for the numbers 0, 1, 2 or 3; and
$A^-$ means an anion.

3. Hydrazone dyestuff of the general formula

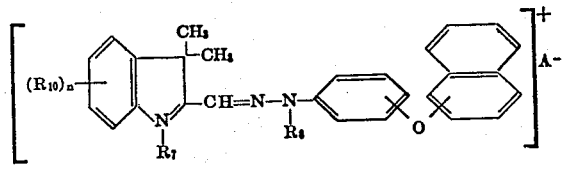

in which
$R_7$, $R_8$, $R_{10}$ $n$ and $A^-$ have the same meaning as in claim 2.

4. Hydrazone dyestuff of the general formula

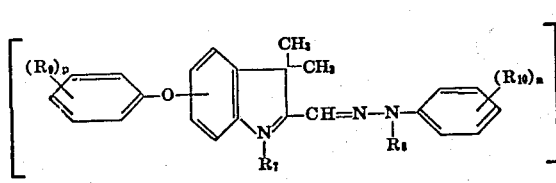

in which
$p = 0, 1, 2$ or $3$
$R_7$, $R_8$, $R_9$, $R_{10}$, $n$ and $A^-$ have the same meaning as in claim 2.

5. Hydrazone dyestuff of the general formula

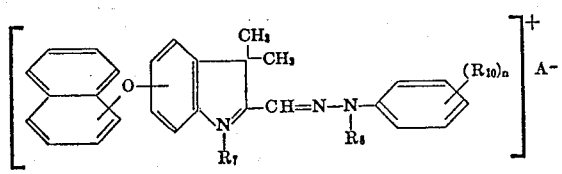

in which
$R_7$, $R_8$, $R_{10}$, $n$ and $A^-$ have the same meaning as in claim 2.

6. Hydrazone dyestuff of the general formula

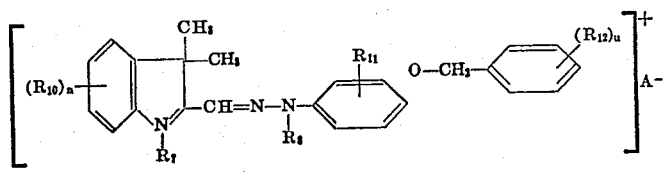

in which
$R_7$, $R_8$, $R_{10}$, $n$ and $A^-$ have the same meaning as in claim 2;
$R_{11}$ means hydrogen, methyl, ethyl, methoxy, ethoxy or chlorine;
$R_{12}$ means identical or different methyl and/or chlorine substituents; and
$u$ means the numbers 0, 1, 2 or 3.

7. Hydrazone dyestuff of the general formula

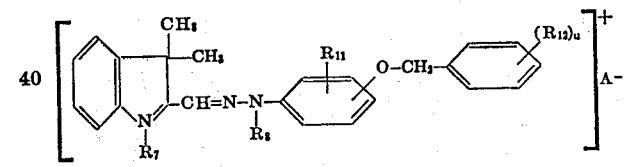

in which
$R_7$, $R_8$, $R_{11}$, $R_{12}$, $u$ and $A^-$ have the same meaning as in claim 6.

8. Hydrazone dyestuff of the general formula

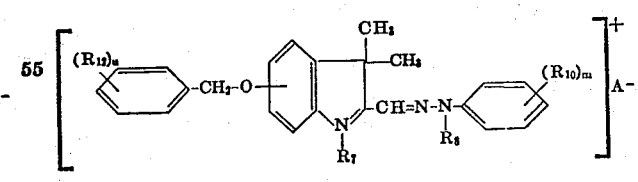

in which
$R_7$, $R_8$, $R_{10}$, $R_{12}$, $m$, $u$ and $A^-$ have the same meaning as in claim 6;

9. Hydrazone dyestuff of the general formula

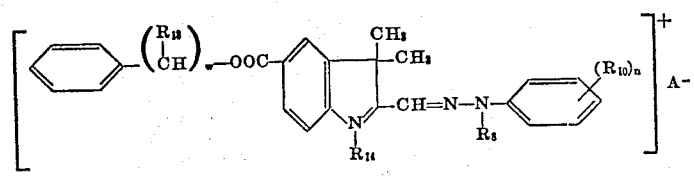

in which $R_8$, $R_{10}$, $n$ and $A^-$ have the same meaning as in claim 2;
$R_{13}$ means hydrogen or methyl;
$R_{14}$ means methyl or ethyl; and
$w$ means the numbers 1, 2 or 3.

10. Hydrazone dyestuff according to claim 1, in which $A^-$ represents the formate, acetate or lactate anion.

References Cited
UNITED STATES PATENTS

| | | | |
|---|---|---|---|
| 3,113,825 | 12/1963 | Streck | 260—240 G |
| 3,574,200 | 4/1971 | Brack | 260—240 E |

FOREIGN PATENTS

| | | | |
|---|---|---|---|
| 206,549 | 12/1959 | Austria | 260—240 G |
| 1,232,714 | 5/1971 | England | 260—240 G |

JOHN D. RANDOLPH, Primary Examiner

U.S. Cl. X.R.

8—3, 12, 54.2, 177 R, 177 AB, 178 E, 178 R, 179; 106—22; 260—141, 165, 326.11, 576